United States Patent [19]
Fifield

[11] Patent Number: 5,268,028
[45] Date of Patent: Dec. 7, 1993

[54] LIGHTWEIGHT CONCRETE ROOF TILES AND SIMILAR PRODUCTS

[75] Inventor: John A. Fifield, Buckinghamshire, Great Britain

[73] Assignee: Oldcastle, Inc., Los Angeles, Calif.

[21] Appl. No.: 965,989

[22] PCT Filed: Aug. 22, 1988

[86] PCT No.: PCT/GB88/00691

§ 371 Date: Jun. 19, 1989

§ 102(e) Date: Jun. 19, 1989

[87] PCT Pub. No.: WO89/01918

PCT Pub. Date: Mar. 9, 1989

Related U.S. Application Data

[63] Continuation of Ser. No. 348,639, Jun. 19, 1989, abandoned.

[30] Foreign Application Priority Data

Aug. 25, 1987 [GB] United Kingdom ............ 8719998
Jan. 15, 1988 [GB] United Kingdom ............ 8800907

[51] Int. Cl.$^5$ .............................................. C04B 24/34
[52] U.S. Cl. ................................. 106/726; 106/823; 52/536
[58] Field of Search ........................... 106/93, 315

[56] References Cited

U.S. PATENT DOCUMENTS

| | | |
|---|---|---|
| 4,460,635 | 7/1984 | Jones et al. |
| 4,654,085 | 3/1987 | Schinski ............ 106/93 |
| 4,673,659 | 6/1987 | Wood et al. ........ 106/98 |
| 4,707,188 | 11/1987 | Tsuda et al. ...... 106/93 |
| 4,746,365 | 5/1988 | Babcock et al. |
| 4,849,018 | 7/1989 | Babcock et al. |
| 4,878,948 | 11/1989 | Shah ................. 106/90 |
| 4,880,467 | 11/1989 | Rirsch et al. ...... 106/90 X |
| 4,959,250 | 9/1990 | McKinnon |
| 4,975,303 | 12/1990 | McKinnon |

FOREIGN PATENT DOCUMENTS

| | | |
|---|---|---|
| 069586 | 4/1986 | European Pat. Off. |
| 269015 | 6/1988 | European Pat. Off. |
| 1572742 | 6/1969 | France |
| 2155297 | 5/1973 | France |
| WO8503069 | 7/1985 | PCT Int'l Appl. |
| WO8906728 | 7/1989 | PCT Int'l Appl. |
| 896450 | 6/1960 | United Kingdom |
| 1225755 | 3/1971 | United Kingdom |
| 1408386 | 10/1975 | United Kingdom |
| 2163421A | 2/1986 | United Kingdom |
| 2164340A | 3/1986 | United Kingdom |

OTHER PUBLICATIONS

Chemical Abstracts, vol. 104, No. 20, May 1986, Abstract No. 173323b.
*Chemical Abstracts*, 105:213367y.
*Chemical Abstracs*, 94:108249t.
*Chemical Abstracts*, 104:114971p.

Primary Examiner—Carl D. Friedman
Assistant Examiner—Lan M. Mai
Attorney, Agent, or Firm—Panitch Schwarze Jacobs & Nadel

[57] ABSTRACT

A lightweight concrete product in the form of a concrete roof tile is made from a cementitious mixture comprising a porous lightweight aggregate, an hydraulic cement, water, an agent for enhancing flexural strength and an agent for enhancing the water retention capacity of the lightweight aggregate, the proportions being such that the product has satisfactory impact and flexural strengths.

13 Claims, 3 Drawing Sheets

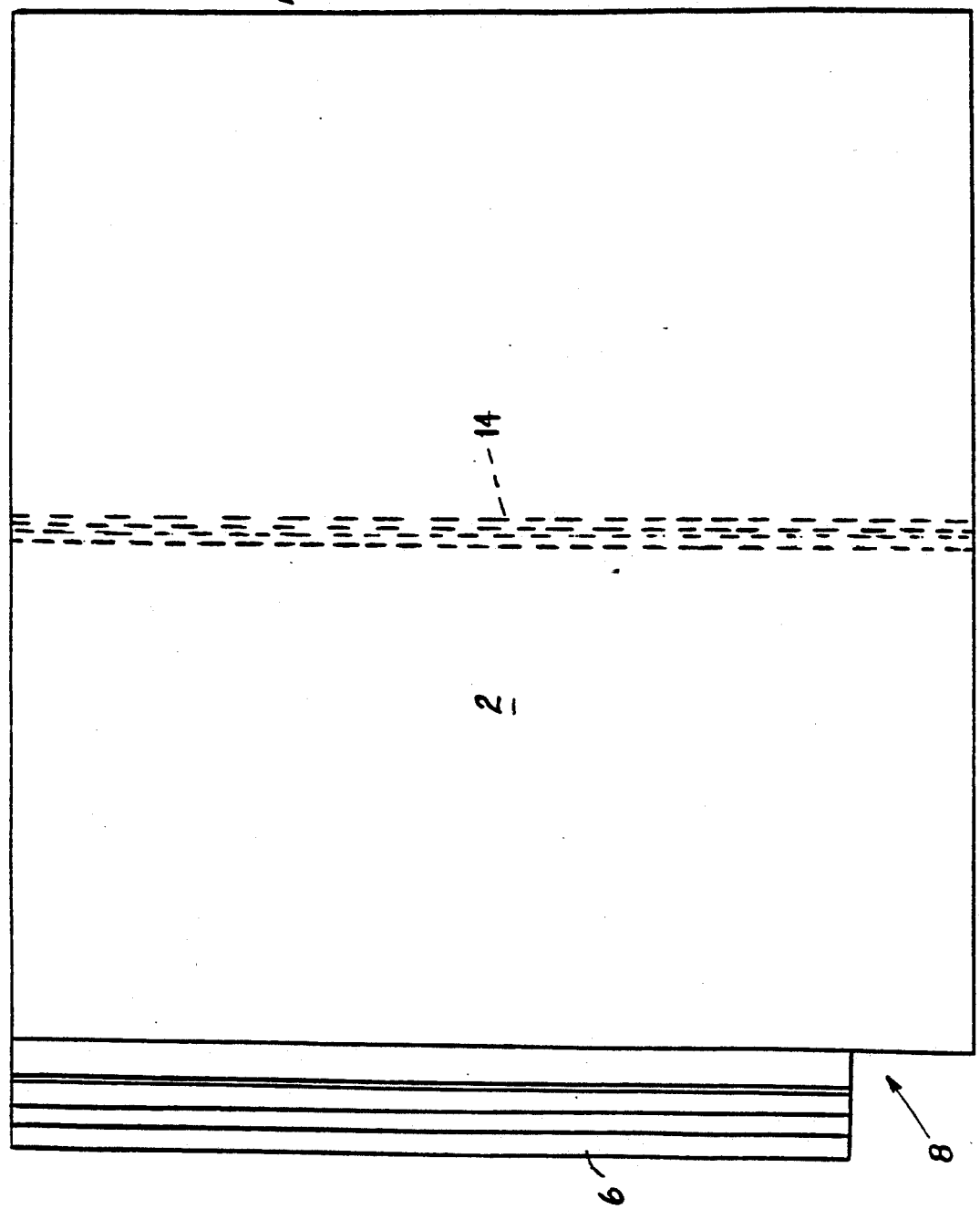

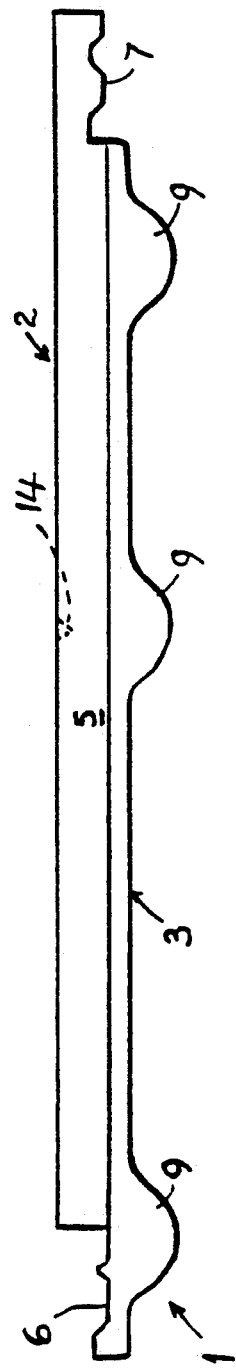
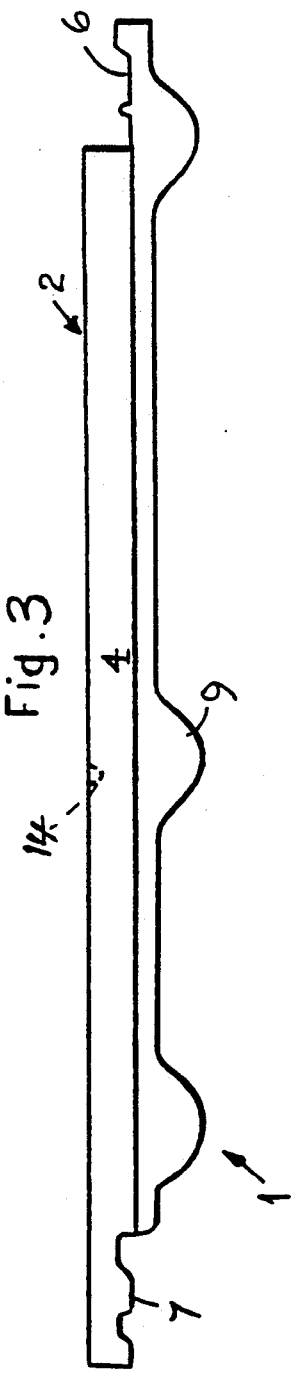

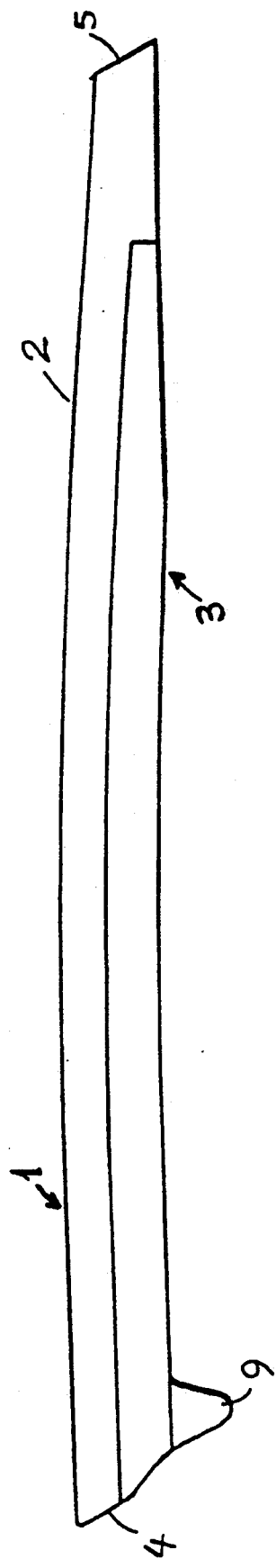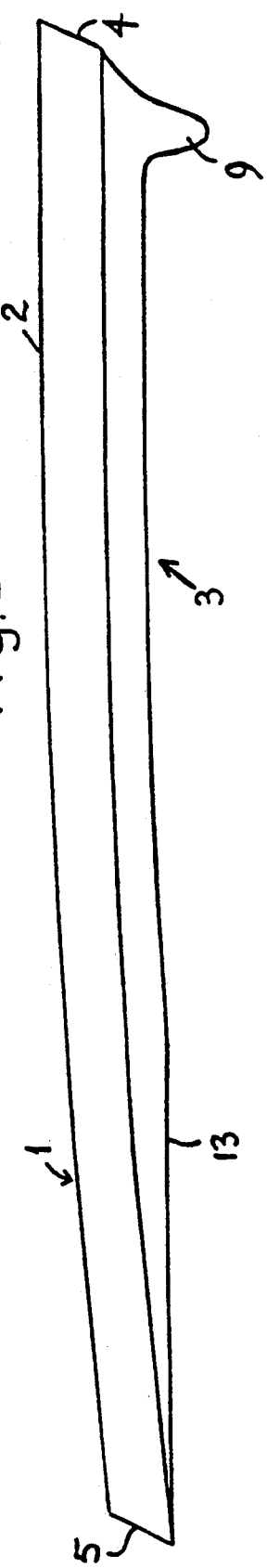

LIGHTWEIGHT CONCRETE ROOF TILES AND SIMILAR PRODUCTS

CROSS-REFERENCE TO RELATED APPLICATIONS

This is a continuation of copending U.S. patent application Ser. No. 07/348,639, filed Jun. 19, 1989, now abandoned.

The present invention relates to so-called lightweight concrete products such as roof and cladding tiles and roof and cladding sheets, and more particularly to lightweight extruded concrete roof tiles.

Extruded concrete roof tiles are made from a cementitious mixture including sand and/or other aggregate, cement, colouring pigment and water plus optionally one or more other additives to facilitate extrusion, prevent growth of fungus etc. Such tiles have been produced for over forty years with apparatus including a hopper-like box which is disposed above a conveyor path and which is charged with the cementitious mixture. The flow of the cementitious mixture is assisted in the box by means of a rotating paddle disposed therewithin. A succession of pallets for moulding the undersurface of the tiles is driven along the conveyor path and beneath the box so that the cementitious mixture forms on the pallets and is compressed therein by means of a rotating roller disposed within the box upstream of the paddle and having a contour which corresponds to the upper surface of the tiles to be formed.

The cementitious mixture is further compressed on the pallets as they pass out of the box by means of a slipper which is disposed downstream of the roller and also has a contour which corresponds to that of the upper surface of the tile to form a continuous extruded ribbon of cementitious mixture on the pallets. The ribbon is subsequently cut into tile forming lengths downstream of the box by means of a suitable cutting knife and the pallets with the formed tiles thereon are conveyed to a curing location. At the curing location, the tiles are conveyed through a curing chamber which is maintained at a high relative humidity and temperature. The curing time is usually in excess of 6 hours. The tiles undergo only a partial curing in the curing chamber from whence they are conveyed to and stacked out-of-doors, to complete the curing process.

There has been the need for some years now for an extruded concrete roof tile which is lighter than ordinary concrete roof tiles made from a cementitious mixture which includes sand and/or other aggregates, for use as a roof covering, and more particularly to replace old coverings which are lighter in weight than ordinary concrete roof tiles.

In the early 1980's the Applicants commenced their research and development into the production of lightweight extruded concrete roof tiles which would be acceptable as replacements for the previously mentioned coverings, i.e. exhibit a weight similar to the aforementioned coverings. In the Applicant's knowledge, such a lightweight tile must also preserve those essential characteristics which have made ordinary extruded concrete roof tiles enjoy widespread acceptance throughout the world. Thus, an extruded lightweight concrete roof tile should have characteristics which are similar in value to those of ordinary concrete roof tiles. Characteristics which are pertinent are flexural strength (i.e. transverse strength), impact strength, frost resistance and low porosity.

In the early 1980's the Applicants made thinner section concrete roof tiles by replacing 10% of the cement with microsilica in the form of silica fume, but found that although the tiles produced had the benefits of being slightly thinner and lighter than ordinary concrete tiles, they were not sufficiently light to replace the coverings referred to earlier.

In an ordinary concrete roof tile the heaviest component by volume is the sand aggregate. Thus, the aim was then as it has been during the following years to replace the sand aggregate either completely or in part by an aggregate of lighter weight.

What the industry needed was a lightweight roof tile having the characteristics previously referred to. This means a tile that in performance complies with British Standards. One example would be a tile of the general type sold by the Applicants under the trade mark VANGUARD 83 but of lighweight.

During 1983 the Applicants looked at the possibility of using a lightweight aggregate, possibly with or without microsilica (silica fume) and, at the time, used a variety of materials with a view to achieving the desired reduction in weight. Further, the Applicants manufactured several batches of lightweight concrete roof tiles in 1983 having the following constituents:

a) a lightweight aggregate to replace sand and/or aggregate in the form of sintered pulverised fuel ash (PFA) sold under the trade mark LYTAG, graded down by the Applicants to a particle size range of normal sands and/or aggregates used in ordinary concrete roof tiles.

b) microsilica in the form of a non-thixotropic silica fume, e.g. manufactured by EL KEM Ltd., c) a hydraulic cement complying with BS12 manufactured in the United Kingdom, and d) water.

Although the Applicants achieved the required reduction in weight for "VANGUARD 83" type tiles, the flexural strength of such tiles after the normal curing period was unacceptable as compared to ordinary concrete roof tiles.

The tiles which were of similar dimensions to the VANGUARD 83 tiles made by the Applicants since the middle of 1983 were made on the pallets of VANGUARD (trade mark) tiles, subject of UK Registered Design No. 896450, which were discontinued at that time. In view of the aforementioned disadvantages, the Applicants research and development on this particular product was discontinued in the middle of 1983 and not recommenced until March 1986, prompted by the publication of UK patent specification No. 2163421A. The reason for this is that UK patent specification No. 2163421A discloses a lightweight concrete roof tile comprising a lightweight aggregate such as expanded clay, a microsilica in the form of a non-thixotropic silica fume, and a suitable hydraulic cement and water, with the only additional ingredient to those used in the Applicant's lightweight "VANGUARD" tiles being a dispersing agent for the silica fume.

Thus in March 1986 the Applicants checked samples of their previously manufactured lightweight tiles and found to their surprise that these tiles now had an acceptable flexural strength which was consistent with the disclosure of UK patent specification No. 2163421A. However, what the Applicants did not know was when the flexural strength gain had become acceptable nor why. The Applicants still have tiles from 1983 which can be identified as they were made on discontinued pallets of the aforementioned "VANGUARD" tiles of registered design No. 896450.

The Applicants recommenced their research and development to manufacture an extruded lightweight concrete roof tile. A lightweight extruded concrete roof tile made in the United States of America was obtained by the Applicants. This sample was analysed and it appears that it could well have been manufactured in accordance with patent specification No. 2163421A. The Applicants were told by contractors in the U.S.A. that although the tiles had good flexural strength, they were much too brittle, i.e. their impact strength was much less than that of ordinary concrete roof tiles.

The Applicants produced a batch of extruded lightweight concrete roof tiles on the VANGUARD 83 pallets with the existing VANGUARD 83 tile extrusion apparatus, containing the following materials:
1) Crushed and graded lightweight aggregate constituted by sintered pulverised fuel ash sold under the trade mark LYTAG.
2) An interground hydraulic cement/silica fume compound, and
3) Water.

Even though the weight was acceptable and the flexural strength was good, such tiles still had a low impact strength. It was found that the use of microsilica increased the tendency of microcracking due to plastic shrinkage. This in turn reduced the number of freeze thaw cycles the product could withstand. So, the Applicants were up against the solving of a two-fold problem, namely:
i) Low impact strength
ii) Microcracking.

With a view to solving problems (i) and (ii), the Applicants reviewed work carried out in the 1970's involving the incorporation of styrene butadiene resin (SBR) into mortar screeds. The manufacturer's claimed benefits for the use of SBR were increased flexural strength and less frost damage It was found from photomicrographs of the resin modified concrete screed at that time that frost damage was reduced, not by the prevention of the formation of microcracks but by the polymer strands of the resin bridging the microcracks and preventing further opening up of the cracks due to water absorption.

However, the curing time of the concrete screed was delayed by an amount which would not be acceptable to concrete roof tiles.

The literature reveals various resin modified concrete products, for example European patent specification No. 69586 B1 published in April of 1986 which is concerned with the solving of the problem of low tensile and flexural strengths and UK patent specification No. 2164340A published in September 1984 which is concerned with the problem of simulating natural roof slates or stones by the use of a moulded resin product incorporating three aggregates of different grade sizes.

However, neither of these two patent specifications assisted the Applicants in the development and invention of a lightweight extruded concrete roof tile which overcomes the aforementioned disadvantages. The process described in EP No. 69586 B1 utilizes a two stage curing process, a first stage at elevated temperature and a humidity minimum of 79% and a higher second stage temperature and a humidity of less than 50% which would be incompatible with normal concrete roof tile curing.

In May 1987 the Applicants made two production runs incorporating the following materials in the mix:

| | | |
|---|---|---|
| I) | a) | sand graded to the desired specification, |
| | b) | ordinary hydraulic Portland cement to BS12, |
| | c) | a styrene acrylic emulsion, and |
| | d) | water to achieve desired consistency. |
| II) | a) | sintered pulverised fuel ash graded to the desired specification, |
| | b) | ordinary hydraulic Portland cement to BS12, |
| | c) | a styrene acrylic emulsion, and |
| | d) | water to achieve desired consistency. |

An increase in water content was used in II) because of the porosity of the lightweight aggregate used. In both runs I) and II) tiles of ordinary concrete roof tile thickness were produced. Surprisingly it was found that with production run II) the tiles had a significantly higher flexural strength than for ordinary concrete roof tiles produced on the same day which must have been imparted to those tiles by the resin content whereas in product run I) the tiles had only a marginally higher increase in flexural strength.

Normally one would expect to find that a sand/cement mix without resin gives a higher flexural strength. Thus, this was the first indication of an unexpected difference and surprising behaviour of the materials in the cured product.

The cementitious mix used for ordinary concrete roof tile production normally contains excess water over that required for hydration of the cement in order that the tiles may be successfully extruded/moulded. In the normal curing process, some of the water in the mix is lost by evaporation into the curing environment. Notwithstanding this water loss by evaporation it is expected that sufficient water is retained in the product for the hydration to continue.

For the mix in run I) the starting water content, due to the presence of the styrene acrylic resin, was significantly lower than a comparable mix not containing the resin and the loss of water due to evaporation rendered the product partially deficient in water during the curing process and hence stopped the hydration of the cement in the product.

Applicants made an unexpected and surprising discovery with regard to the mix in run II). They found that, because of the porous nature of the sintered pulverised fuel ash, water was held by the aggregate which became available for the continued hydration of the cement, as some of the water in the curing product evaporated. Hence it is the Applicant's realization that it is critical that the water retention of the product is maintained throughout the curing process.

The Applicants looked for ways of causing the porous lightweight aggregate to retain the water content in the mix and keep it relatively high throughout the entire curing process. After a number of experiments it was found that the water retention properties of the curing product could be enhanced during the curing process.

It was found in the tests of extruded concrete roof tiles produced according to the materials as mentioned in run II) but with the addition of a water retention enhancement agent, that the tiles had a much improved flexural strength compared with ordinary concrete roof tiles of the same thickness. And, moreover the weight and thickness of the tile was reduced bringing the weight down to some 40% below that of an ordinary concrete tile.

Further tests carried out on the tiles produced showed an improved flexural strength as compared to ordinary concrete roof tiles tested to British Standards over similar periods of time. And, the impact test in which a ball bearing was dropped onto the tile in various places, did not shatter the tile, showing that there was an improvement in impact strength to a satisfactory level.

Applicants have also found that the cementitious mixture is suitable for improving the flexural and impact strengths of other concrete products, in particular roofing and cladding sheets which span greater distances than tiles and which are used in the weather-proofing of industrial buildings where the aesthetic properties of tiles are not required. Since the banning of asbestos there has been no satisfactory replacement for asbestos based roofing and cladding sheets to provide a satisfactory lightweight industrial roofing product.

Accordingly, the present invention consists in a lightweight concrete product, such as a roof tile, formed from a cementitious mixture comprising a porous lightweight aggregate, an hydraulic cement, water, an agent for enhancing flexural strength and an agent for enhancing the water retention capability of the lightweight aggregate, the proportions being such that the product has satisfactory impact and flexural strengths.

Thus, by means of the invention Applicants have solved the problem of low impact strength and in solving this problem it was found that results from freeze thaw tests show a significant improvement.

Whilst Applicants' invention is applicable to roofing products, as referred to hereinabove, reference will now be made to concrete roof tiles with which Applicant's invention has been particularly concerned.

The Applicant's understanding is that the lightweight nature of the concrete roof tile is contributed to by the use of a water retention enhancement agent which causes air entrainment of the cementitious mix. This forms sufficiently small bubbles in the finished tile but does not damage the flexural strength nor the porosity of the product. Moreover, because of the presence of bubbles the rheology of the mix is improved beyond that of previously known mixes so that the product is more readily extruded.

Furthermore, the curing conditions remain the same as for ordinary concrete roof tiles. It is indeed surprising that the mere introduction of a water retention enhancement agent, in combination with a flexural strength enhancement agent provide the two keys which enable a lightweight extruded concrete roof tile to be produced which not only increases the flexural strength of the product, but also its impact strength, and resistance to frost damage.

The water retention enhancement agent may be of any suitable kind but a cellulose ether such as hydroxypropylmethyl cellulose is preferred. Moreover, the flexural strength enhancement agent is preferably a resin and advantageously a styrene acrylic or other suitable polymer resin such as an acrylic resin or even a terpolymer resin.

Preferably, the porous lightweight aggregate is sintered pulverized fuel ash such as that sold under the Trade Mark LYTAG but may be an expanded clay, exfoliated slate, expanded fire clay grog, furnace bottom ash, foamed slag etc.

In certain instances some of the lightweight aggregate may be replaced by an appropriate amount of sand or other similar aggregate such as crushed limestone, or crushed granite etc. provided that the overall weight of the tile is within the desired limits.

Preferably, the materials used are in the following ranges of percentages by weight.

| | |
|---|---|
| Porous lightweight aggregate | 44 to 74% |
| Hydraulic cement | 10 to 40% |
| Water | 4.0 to 14% |
| Resin | 0.5 to 15% |
| Cellulose ether | 0.01 to 1.0% |
| Pigment | 0 to 3.0% |

The invention will now be further explained with reference to the accompanying examples:-

EXAMPLE I

A cementitious mixture was formed using the following ingredients in the designated percentages by weight:
1) lightweight aggregate in the form of sintered pulverised fuel ash (LYTAG) namely:

| | |
|---|---|
| a) all in fines - 4 mm down to dust | 34.20% |
| b) separated fines | 22.40% |
| 2) ordinary hydraulic Portland cement to BS12 | 27.20% |
| 3) styrene acrylic emulsion (ADH 3080) | 3.80% |
| 4) hydroxypropylmethyl cellulose (Methocel TM) | 0.05% |
| 5) water, and | 11.60% |
| 6) pigment | 0.80% |

The cellulose ether was added to the lightweight aggregate and mixed with a proportion of the water. Portland cement was then added to the mix followed by the addition of the resin and the pigment and the water content completed up to the desired consistency. Having been thoroughly mixed the mixture was then fed to the tile extrusion machine and extruded on pallets using normal extrusion processes to form a continuous extruded ribbon which is cut into tile forming lengths The pallets containing the uncured tile forming lengths were then passed to a curing chamber and the tile forming lengths were cured at normal curing humidities and temperatures as for normal concrete tiles. There was no change in the normal curing parameters. The tile machine extrusion head was set to obtain a tile having the desired thickness to achieve the desired product weight, flexural strength and impact strength. After passing from the curing zone, the curing process was completed, as is usual with ordinary concrete roof tiles, and after further selected periods tiles were selected at random and subjected to flexural strength, impact strength, frost resistance and porosity tests, the results of all of which were acceptable. The weight of the tiles was around 40% lighter and the flexural strength about 20% higher than normal concrete roof tiles.

EXAMPLE II

A cementitious mixture was formed using the following ingredients in the designated percentages by weight:

| | |
|---|---|
| 1. Liapor Sand K (0–4mm) (Expanded clay aggregate) | 57.00% |
| 2. Ordinary Portland Cement to BS12 | 26.00% |
| 3. Styrene Acrylic Emulsion (Scott Bader Development Product) | 3.80% |

-continued

| | |
|---|---|
| 4. Hydroxypropylmethyl cellulose | 0.06% |
| 5. Water | 12.34% |
| 6. Pigment | 0.80% |

The cementitious mixture was prepared, and the tiles made, as in Example I. The weight of the tiles was around 40% lighter and the flexural strength about 15% higher than normal concrete tiles.

EXAMPLE III

A cementitious mixture was formed using the following ingredients in the designated percentages by weight:

| | |
|---|---|
| 1. Furnace Bottom Ash | 46.00% |
| 2. Sand | 9.45% |
| 3. Ordinary Portland Cement | 27.20% |
| 4. Acrylic Emulsion 13-002 (Modified with melment - Development Product) | 4.30% |
| 5. Hydroxypropylmethyl Cellulose | 0.05% |
| 6. Water | 12.20% |
| 7. Pigment | 0.80% |

The cementitious mixture was prepared, and the tiles made, as in Example I. The weight of the tiles was around 40% lighter than normal concrete tiles and the flexural strength around the same as normal tiles.

An embodiment of a tile which is made according to any one of the Examples is illustrated, by way of example, in the accompanying drawings, in which:

FIG. 1 is a top plan view of a lightweight concrete roof tile, made in accordance with the invention, FIGS. 2 and 3 are upper and leading end or edge views respectively of the tile of FIG. 1, and FIGS. 4 and 5 are opposite side views to an enlarged scale respectively of the concrete tile of FIG. 1.

The concrete roof tile 1 shown in FIGS. 1 to 5 is a concrete slate of generally rectangular configuration when considered in plan and has upper and undersurfaces 2 and 3 respectively, an upper edge 4, a lower (leading) edge 5, interlocks extending along its opposite side edges in the form of an underlock 6 and an overlock 7, which respectively engage with the over and underlocks of adjacent tile of the same row. At the leading edge region of the tile the underlock 6 has a cut-out 8, which enables the leading edges of the tile to be reduced and the aesthetic appearance of a natural slate and normal plain tile to be maintained.

The undersurface 3 of the tile may be provided with hanging nibs 9 and wind barriers (not shown) and also, as is known, has hollowed out portions (not visible,) to reduce weight. The tile may be provided with nail holes (not shown) adjacent to the nibs 9 and is of cambered geometry, with the camber extending from the upper edge 4 to leading edge 5 as will be apparent from FIGS. 4 and 5.

As will be readily apparent from FIGS. 4 and 5, the undersurface portion 13 adjacent to the leading edge 5 is inclined at an angle with respect to the upper surface 2, i.e. is thinned, by making the pallets on which the tiles are extruded of an appropriate shape, thereby to produce a leading edge which is aesthetically acceptable.

By manufacturing the tile 1 with a longitudinal groove 14 as shown in dashed lines in FIGS. 1 to 3 running the full length of the tile there is formed a one piece two tile plain tile.

When the tiles 1 are mounted on battens fixed to roof rafters the tiles appear on the roof with their narrow, aesthetically acceptable leading edges 5. Such tiles are disclosed in the specification of PCT Patent Specification No. WO 89/06728.

Although the invention has been particularly described it should be appreciated that it includes all modifications and variations falling within its scope. It should be appreciated that in this specification the term "concrete products" includes within its ambit roof tiles, 'cladding' tiles, promenade tiles which are used on flat roofs, and roofing and cladding sheets, which may be flat, profiled or corrugated.

I claim:

1. A concrete product, such as a roof tile, formed from a cementitious mixture comprising a porous lightweight aggregate capable of retaining water, an hydraulic cement, water, an agent in the form of a polymer for enhancing flexural strength and an agent for enhancing the water retention capacity of the porous lightweight aggregate during curing of the formed product so that water is held by the porous lightweight aggregate in the curing formed product and becomes available for continued hydration of the hydraulic cement as some of the water in the curing formed product evaporates, thereby to maintain water retention of the curing formed product throughout the curing process, wherein the porous lightweight aggregate, hydraulic cement, water, flexural strength enhancing agent and water retention enhancing agent are present in amounts to provide the cured formed product with high impact and flexural strengths.

2. A concrete product as claimed in claim 1, wherein the water retention enhancement agent is a cellulose ether.

3. A concrete product as claimed in claim 2, wherein the cellulose ether is hydroxypropylmethyl cellulose.

4. A concrete product as claimed in claim 1, wherein the polymer is a polymer resin.

5. A concrete product as claimed in claim 4, wherein the polymer resin is a terpolymer resin, an acrylic resin or a styrene acrylic resin.

6. A concrete product as claimed in claim 1, wherein the porous lightweight aggregate is sintered pulverized fuel ash, expanded clay, exfoliated, slate, expanded fire clay grog or furnace bottom ash.

7. A concrete product as claimed in claim 1, further comprising sand, crushed limestone, crushed granite or other suitable aggregate material.

8. A concrete product as claimed in claim 1, comprising

| | |
|---|---|
| Porous lightweight aggregate | 44 to 74% by weight |
| Hydraulic Cement | 10 to 40% by weight |
| Water | 4.0 to 14% by weight |
| Styrene acrylic resin | 0.5 to 15% by weight |
| Cellulose ether | 0.01 to 1.0% by weight, and |
| Pigment | 0 to 3.0% by weight |

9. A concrete product as claimed in claim 1, comprising

|  |  |
|---|---|
| sintered pulverised fuel ash | |
| a) all in fines - 4 mm down to dust | 34.20% by weight |
| b) separated fines | 22.40% by weight |
| ordinary hydraulic Portland Cement to BS12 | 27.20% by weight |
| styrene acrylic emulsion [(ADH 3080)] | 3.80% by weight |
| hydroxyproplmethyl cellulose | 0.05% by weight |
| water | 11.60% by weight, and |
| pigment | 0.80% by weight. |

10. A concrete product as claimed in claim 1, comprising

|  |  |
|---|---|
| Expanded clay aggregate (0-4 mm) | 57.00% by weight |
| ordinary Portland Cement to BS12 | 26.00% by weight |
| Styrene acrylic emulsion (Scott Bader Development Product) | 3.80% by weight |
| Hydroxypropylmethyl cellulose | 0.06% by weight |
| water | 12.34% by weight, and |
| pigment | 0.80% by weight. |

11. A concrete product as claimed in claim 1, comprising

|  |  |
|---|---|
| furnace bottom ash | 46.00% by weight |
| sand | 9.45% by weight |
| ordinary Portland Cement | 27.20% by weight |
| acrylic [Emulsion 13-002] emulsion | 4.30% by weight |
| hydroxypropylmethy [Cellulose] cellulose | 0.05% by weight |
| water | 12.20% by weight, and |
| pigment | 0.80% by weight. |

12. A concrete product as claimed in claim 1 and in the form of a roof, cladding or promenade tile.

13. A concrete product as claimed in claim 1 and in the form of a roofing or cladding sheet.

* * * * *